Sept. 26, 1950          A. FORTIER          2,523,564

PNEUMATIC MEASURING APPARATUS

Filed Aug. 6, 1947

INVENTOR
A. L. A. FORTIER,
BY
ATTORNEY

Patented Sept. 26, 1950

2,523,564

UNITED STATES PATENT OFFICE 2,523,564

PNEUMATIC MEASURING APPARATUS

André Fortier, Grenoble, France, assignor to Estavex S. A., Geneva, Switzerland, a corporation of Switzerland Application August 6, 1947, Serial No. 766,845
In Switzerland December 4, 1942

Section 1, Public Law 690, August 8, 1946
Patent expires December 4, 1962

3 Claims. (Cl. 73—37.5)

The testing of the sides of a machined article is usually effected by means of gauges or templets. As these sides are determined with a predetermined tolerance, a maximum gauge and a minimum gauge are employed for a given side, the article being capable of passing freely through one but not through the other. The use of gauges thus necessitates two control operations; further in the case of an article of which the controlled side is in the vicinity of one of the limits, there is a temptation to strain the gauge, which makes the measurement defective and in the course of time damages the gauge; finally, maximum and minimum gauges do not give any indication as regards the distance of a side of a recessed part relatively to the normal side.

The utilisation of the flow of gas enables a single gauge or templet to be used for verifying a determined side. This verification is effected in a single operation without any contact between the gauge and the article, thus without possible wear of the gauge. In the case of an article of which the side to be verified is outside the tolerances, the apparatus indicates directly the true side. Finally a large number of measurements or methods of verification which hitherto required interventional methods may be effected, by the same method, by means of apparatus which are sturdy and easy to manipulate. The applications of measuring apparatus with a flow of gas are numerous, amongst which may be mentioned the measurement of wedges, the study of the state of a surface, the verification of the smoothness of a plane surface, the verification of bores, the verification of usual calibrations and so forth.

The principal of the method is the following; a surface is approached towards a measuring orifice in communication with a tank of compressed air; when the distance $d$ of the orifice from the surface is small relatively to its diameter, the outflow of gas in proportion to the distance $d$ (for a given orifice). The measurement of the outflow thus enables the distance $d$ to be estimated, but as this measurement is not a simple operation, a measurement of pressure is substituted therefor.

Apparatus based on this principle, known under the name pneumatic micrometers, are provided with a container supplying the gas under constant pressure and with two orifices arranged in series; the first orifice being a calibrated jet and the second a measuring orifice. A pressure gauge connected to the space between the jet and the measuring orifice enables the pressure developed in this space to be measured. This pressure is a measurement of the distance of the measuring orifice from a plane, for example, when the outflow section for the gas is smaller than the cross section of the measuring orifice.

These apparatus cannot be used commercially as the holder is a delicate apparatus which does not enable the constancy of pressure at the inflow of the jet to be verified in an easy manner. This pressure varies in fact when the outlet cross section varies and when the pressure measured by the gauge varies. Thus for each type of measurement it is first of all necessary to ensure the constancy of pressure at the inflow of the jet.

Further, the delivery of an orifice, for a given gas, is not only in proportion to the inflow and outflow pressures, but is also dependent on the shape of this orifice, on the condition of its surface and on the velocity of gas passing from the orifice. But in the case of measurements, the cross section of the outlet varies in shape and in dimensions for each measurement and this also applies to the condition of the surface. It thus follows that the precision cannot be guaranteed with certainty. Thus it may occur that the velocity of flow of gas on its passage through one of the orifices (measuring jet orifice or outlet orifice) is near to the critical velocity between a laminary flow and a turbulent flow. In this case a state of equilibrium cannot be reached and no measurement is possible.

The present invention has for its subject a pneumatic measuring apparatus adapted to be supplied by a source of compressed gaseous fluid and provided with at least one measuring orifice, a jet and a gauge for measuring the pressure of the gaseous fluid, in the space located between the jet and the measuring orifice. This apparatus eliminates the disadvantages mentioned, by the fact that the cross section of the passage of the measuring orifice is at least twice as large as that of the jet so that the pressure developed at the inflow to the latter is at least four times as large as that obtaining at the outflow from the measuring orifice.

One form of construction of the apparatus forming the subject of the invention is shown by way of example and diagrammatically in the accompanying drawing, wherein.

Figure 1:
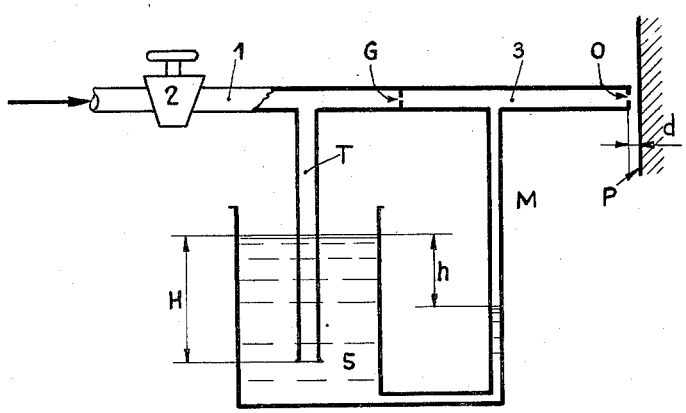
Fig. 1 shows a diagram of known pneumatic measuring apparatus and using a holder connected to the Mariotte tank.

According to Fig. 1, an inlet pipe for gaseous fluid, provided with a valve 2, leads to a jet G. From this pipe is branched a tube T which dips into a vessel 5 filled with a liquid. The jet G opens into a space 3 open to the outside by a measuring orifice O. In shunt with the space 3 is arranged a gauge tube M communicating with the liquid contained in the vessel 5.

For effecting a measurement the procedure is as follows: The delivery of the valve 2 is so adjusted that the gas escapes, bubble by bubble from the tube T. At this moment the pressure on the inflow side of the jet is equal to atmospheric pressure plus the height H of immersion of the tube T. Under these conditions, when approaching the measuring orifice O of a plane P, the pressure in the space 3 is varied in proportion to the distance $d$ of the said orifice from the plane. In fact when the orifice O is sufficiently close to the plane, the cross section of the gas outlet is no longer determined by the cross section of the orifice O, but by the surface of a ring having as diameter the diameter of the orifice O and as height the distance $d$. If therefore the cross section of the gas outlet is smaller than the cross section of the orifice O, the pressure increases in the space 3 until the delivery of the outlet cross section is equal to the delivery of the jet. These two deliveries are equal when $$ms\sqrt{\frac{2w(H-h)}{\rho}}=m'S\sqrt{\frac{2wh}{\rho}}$$

wherein $s$=the cross section of the jet.
$S$=the cross section of the outlet orifice.
$w$=the specific weight of the liquid.
$h$=difference in liquid levels of vessels 5 and tube M.
$\rho$=the specific mass of the gas.
$m$ and $m'$ are two coefficients of contraction which are determined by the shape, the dimension of the orifices in question, the velocity of the gas on its passage from the orifices and the state of the surface in the vicinity of the orifices.

A marking of the apparatus enables the constants of the apparatus to be determined; then the following formula gives $S$ when $h$ is known:

$$S=A\sqrt{\frac{H}{h}-1}$$

in which expression $$A=\frac{ms}{m}=\text{constant}$$

As indicated above, these apparatus have various disadvantages of which the most important are:

1. The container is a fragile and large apparatus requiring delicate handling. In order that the measurement may be precise, it is necessary for the height of the Mariotte tank to be great (of the order of one metre) so that the pressure H is relatively high. The pressure on the inflow to the jet is equal to H only on condition that the gas leaves the tube T slowly; in fact when the gas escapes simultaneously from this tube the pressure on the inflow side of the jet may be appreciably higher than the height of immersion of the tube; when the gas does not escape from the tube T, the measurement may be entirely faulty. When the useful outlet surface varies, which surface is determined by the distance of the measuring orifice from the plane P, the delivery varies so that it is necessary to ensure that the delivery at the inflow to the jet is always clearly greater than the greatest possible delivery of the measuring orifice. But there are no practical means of ensuring that this condition is fulfilled during the course of measurements.

2. The measurement of the cross section of the fluid outflow, knowing the distance $h$ which represents the difference in the levels of the liquid in the manometric tube M and liquid in tank 5, necessitates a preliminary marking for each type of measurement. In fact this measurement is a function of a coefficient of contraction of the fluid at its outflow. But, when using the most usual apparatus, in which everything depends on measuring the distance of the measuring orifice from a plane, the coefficient varies for each measurement, but what is still more serious is that this coefficient varies according to the state of the surface of the plane. There may even exist a number of possible rules of flow when this velocity is near the critical velocity between laminar flow and turbulent flow so that for a same distance of the measuring orifice from a plane different values of the pressure in space 3 may correspond.

3. In order to permit rapid measurements a permanent relationship must be quickly established. The time for establishing the relationship is directly related to the differential volumetric throughput between the jet and the measuring orifice. For reducing this time it is therefore necessary to reduce this capacity and in particular to reduce the diameter of the manometric tube measuring the pressure $h$. But it is then the viscosity of the manometric liquid which increases the time for establishing the permanent rule and this without taking into consideration the difficulties due to phenomena of capilarity. Further the time for establishing the permanent rule is variable from one measurement to another when the pressure $h$ varies. The duration of a measurement should therefore always be made greater than the maximum time for the stabilisation of the flow.

4. In order to allow of an easy use of the apparatus, it is necessary in practice to connect the measuring orifice to the jet by a flexible pipe. This necessity causes an increase in the capacity of the space included between the jet and the measuring orifice and thus increases to the same extent the duration of the measurements. But such a pipe necessarily increases the risks of leakages of gas at the outflow of the jet, which leakages completely falsify the measurements.

These serious disadvantages of known pneumatic measuring apparatus considerably limit their possibility of use for commercial measurements.

Figure 2:
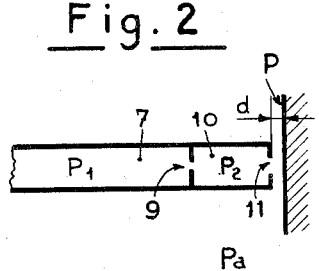
Fig. 2 is a diagram adapted to illustrate the principle of operation of an apparatus according to the invention.

The apparatus (Figs. 2 and 3) is provided with an inlet pipe 7 for gas, adapted to be connected to a source 8 of compressed gas at a pressure greater than four times the pressure obtaining at the outflow of the outlet orifice. In the pipe 7 is provided a jet 9 leading into a space 10 opening to the outside by a measuring orifice 11, of which the cross section of the passage is at least twice as large as that of the jet. A gauge may be arranged in shunt on the space 10 for the purpose of measuring the pressure obtaining in this space. However in a preferred form of construction of the apparatus a pressure ratio gauge 12 is provided. This gauge measures the ratio of the pressure on the inflow to the jet with that of the space 10 and will be described in detail hereinafter.

The operation of the apparatus is as follows:

It is known that the cross section $s$ of the jet determines the inflow pressure $P_1$ and the outflow pressure $P_2$. But when $P_1$ is made sufficiently high so that $$\frac{P_2}{P_1}$$

is smaller than 0.52, the volumetric delivery through the jet becomes independent of the pressures $P_1$ and $P_2$. The delivery in mass of the jet is in this case proportional to $P_1$ and to $s$, the shape of the cross section of minimum area has practically no influence on the coefficient of contraction of the gas.

The velocity of flow gas in the cross section $s$ is in this case equal to the speed of sound under the conditions existing at this point. The velocity of the gas becomes greater than this speed when the cross section increases on the outflow side of the jet, which is the case in the space 10. It is the existance of this velocity of gas, on passage through the jet, rigorously equal to the speed of sound (and this irrespective of the value of the pressure $P_1$, whilst this pressure is greater than twice the pressure $P_2$) which explains the rigorous constancy of the delivery in volume of the jet, and the impossibility of any reaction of the variations of $P_2$ on that which occurs on the inflow side of the jet.

If now the pressure $P_1$ is sufficiently high and a cross section of passage S of the outlet orifice sufficiently large, it is possible to obtain the same conditions of flow to the passage of this orifice as to the passage of the jet. But when the pressure on the outflow side of the outlet orifice is equal to $Pa$ (ambient pressure), it is necessary for $P_2$ to be greater than $$\frac{Pa}{0.52}$$

and $P_1$ greater than $$\frac{P_2}{0.52}$$

$P_1$ should therefore be greater than $$\frac{Pa}{(0.52)^2}$$

that is to say about four times greater than $Pa$. A state of equilibrium is obtained when the deliveries in mass from the jet and from the outflow orifice are equal to one another. For this purpose it is therefore necessary for the cross section of the passage of the outlet orifice to be at least twice as large as the cross section of the passage of the jet.

Under these conditions the delivery in mass for a given gas through jet 9 of which the surfaces is solely a function of $P_1$ and the delivery of the mass through orifice 11 of which the surface S is solely a function of $P_2$.

When the condition of equilibrium is reached, these two deliveries are equal so that $$\frac{s}{S} = \frac{P_2}{P_1}$$

Knowing $s$ and $P_1$, the measurement of $P_2$ gives a measuring of the outlet surface S.

But it will be seen that in fact it is not necessary to know $P_1$ and that it is sufficient to measure the ratio $$\frac{P_2}{P_1}$$

by means of a pressure ratio gauge.

It is interesting to observe that in this case the absolute values of $P_1$ and $P_2$ do not intervene and that the coefficient of contraction of the gas on passage through the outlet orifice does not influence the measurements. Thus when the measuring orifice 11, which necessarily has a cross section of passage greater than that of the outlet orifice, is placed at a distance $d$ from a wall smaller than a quarter of its diameter D, the ratio of the pressures $P_2/P_1$ is a measurement of the surface of flow of the annular outlet orifice $(S = \pi Dd)$.

Thus for obtaining an absolute certainty of measurement, P is preferably selected greater than $4Pa$ and the cross section of the measuring orifice much greater than twice the cross section of the jet passage.

Figure 3:
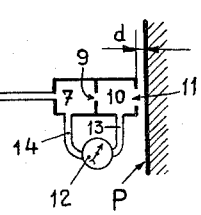
Fig. 3 is a diagram of a measuring plant using an apparatus according to the invention.
Figure 4:
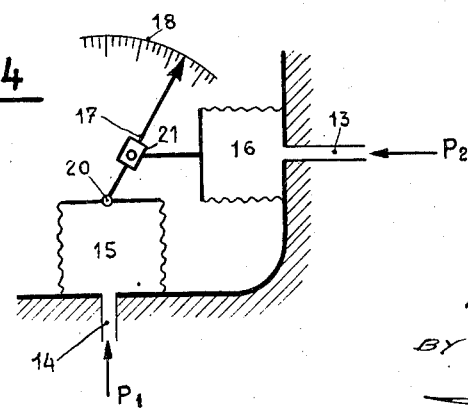
Fig. 4 is a diagram adapted to illustrate the operation of a gauge measuring the ratio between two pressures.

As shown in Fig. 3, the apparatus is connected to a source of compressed gas, provided with its usual holder. The pressure ratio gauge 12 is provided with two pipes 13 and 14 of which one communicates with the space 10 and the other with the space on the inflow side of the jet. The gauge is provided (Fig. 4) with two extensible chambers 15 and 16 and with a pointer 17 pivoted at 20 on the bottom of the chamber 15. The pointer engages with a collar 21 capable of sliding along its stem and secured to the bottom of the chamber 16. The pointer moves along a graduated scale 18. It will at once be seen that the movements of the pointer are a function of the ratio of the movements of the bottoms of the chambers 15 and 16, that is to say $$\frac{P_2}{P_1}$$

For greater clearness of the drawing the gauge 12 is connected by the pipes 13 and 14 to the inflow side and to the outflow side of the jet; however, it is of advantage to arrange the whole of the measuring apparatus in the interior of a protecting casing for the gauge in such a manner that the whole forms an easily manipulatable assembly of small dimensions. In this form of construction only the pipe 7 and the measuring orifice 11 emerge from the casing. In this case it is possible to limit to a minimum the capacity located between the jet and the measuring orifice so that it is possible to reduce the maximum duration of a measurement to a very small period of time, compatible with the requirements of industry.

Finally no flexible pipe is necessary on the outflow side of the jet so that the dangers of leakage which may influence the measurements are not liable to occur. Otherwise it is always easy to varify at every instant the fluid tightness of the capacity comprised between the jet and the measuring orifice as it suffices to close the latter and to control it so that the gauge indicates that $P_2/P_1 = 1$.

When the pipe connecting the source of compressed gas to the apparatus has leakages, these have no influence on the measurements as long as the pressure $P_1$ nevertheless remains sufficiently high. The source of compressed gas may be replaced by a compressor for example.

It is possible to provide two sets interchangeable jets and measuring orifices enabling the sensitiveness of the apparatus to be adapted to the measurement to be made. The limit of sensitivity of this is $1/10000$ mm.

This apparatus may be used in the same way as known apparatus for the verification and the measurement of:

a. Gauges with jaws.
b. Usual gauges and templets.
c. Bores.
d. Wedges.
e. The evenness of a surface.

This apparatus also permits of the study of surfaces (fineness of machining), the continuous measurement of the thickness of thin bands and so forth. The pressure $P_2$ may also be used for the control of the coming into contact without shock of two stops for example.

It will be understood that for the measurement of a bore or the measurement of the thickness of a band, the apparatus should be provided with two measuring orifices, supplied by the same jet, in such a manner that the apparatus solely measures the sum of distances $(d_1+d_2)$ of each measuring orifice from the surfaces facing them.

The conditions for obtaining a velocity of gas equal to the speed of sound through the passage of the orifices have been indicated above solely for diatomic gases for which the ratio of specific heats to the constant volume and to the constant pressure is equal to 1.4. The majority of gases coming into consideration for the pneumatic measurement are diatomic gas (air) of which the ratio of specific heats is equal to 1.4.

When it is desired to use one or more mixed mono-atomic gases it is necessary to take into consideration the fact that the ratio of specific heats is then equal to 5/3.

I claim:

1. A pneumatic measuring apparatus comprising a chamber having an outlet orifice and an inlet for gaseous fluid under pressure, a jet in said chamber between said orifice and said inlet and means for determining the difference between pressures in the chamber on either side of the jet, said orifice having a cross sectional area of approximately twice the cross sectional area of the jet.

2. In a pneumatic measuring apparatus adapted to be supplied by a source of compressed gaseous fluid, the combination with a chamber having at least one measuring orifice, a jet and means for measuring the pressure of the gaseous fluid in said chamber, the cross section of the passage of the measuring orifice being at least twice as large as that of the jet, whereby the pressure on the inflow side of the jet will be maintained four times as large as that on the outflow side of the measuring orifice, said measuring means comprising a gauge and a casing therefor, a gas inlet pipe for said chamber, said inlet pipe, jet and measuring orifice forming a rigid assembly secured to said casing, said measuring means having a movable member, the movements of which are a function of pressure in the space between said jet and said orifice, a graduated scale on said casing, a pointer movable relative to said scale, said pointer being connected for actuation by said movable member, a second movable member responsive to pressure on the inflow side of said jet, said second movable member being connected to said pointer and so located relative to the other movable member that the movements of said member take place along axes at right angles to each other so that the resultant movements of said pointer are functions of the ratio of said pressures.

3. In a pneumatic measuring apparatus adapted to be supplied by a source of compressed gaseous fluid, the combination with a chamber having at least one measuring orifice, a jet and means for measuring the pressure of gaseous fluid in said chamber, the cross section of the passage of the measuring orifice being at least twice as large as that of the jet, whereby the pressure on the inflow side of the jet will be maintained at least four times as large as that on the outflow side of the measuring orifice, said measuring means comprising two chambers, each having a movable wall, said walls being arranged substantially at right angles to each other, a graduated scale, a pointer hinged to one of said walls adapted to move said scale, a link connected to the other wall and engaging the pointer intermediate its ends, one of said chambers being adapted to be subjected to pressure between said jet and said measuring orifice and the other chamber being subjected to pressure on the inflow side of the jet.

ANDRÉ FORTIER.

REFERENCES CITED

The following references are of record in the file of this patent:

UNITED STATES PATENTS

| Number | Name | Date |
| --- | --- | --- |
| 1,007,178 | Billings | Oct. 31, 1911 |
| 1,416,210 | Jung et al. | May 16, 1922 |
| 1,697,344 | Campbell | Jan. 1, 1929 |
| 1,883,522 | Breer | Oct. 18, 1932 |
| 2,223,705 | Roudnicky | Dec. 3, 1940 |
| 2,254,259 | Aller | Sept. 2, 1941 |
| 2,332,567 | Gardner | Oct. 26, 1943 |
| 2,348,985 | Lewis | May 16, 1944 |

FOREIGN PATENTS

| Number | Country | Date |
| --- | --- | --- |
| 149,458 | Switzerland | Dec. 1, 1931 |